United States Patent Office 3,012,888
Patented Dec. 12, 1961

3,012,888
METHOD FOR PREPARING A GRANULAR OIL-FREE PHOSPHATIDE PRODUCT
Paul F. Davis, Chicago, and Michael A. Fello, Maywood, Ill., assignors to Central Soya Company, Inc., Fort Wayne, Ind., a corporation of Indiana
No Drawing. Filed Apr. 13, 1959, Ser. No. 805,710
5 Claims. (Cl. 99—15)

The present invention relates to granular oil-free phosphatides of improved stability. More particularly, it relates to flavor-stable compositions composed essentially of granular oil-free phosphatides and a small amount of reducing saccharide, and to a process for preparing such improved compositions.

This application is a continuation-in-part of our co-pending application Serial No. 596,433, filed July 9, 1956, now abandoned.

Currently, the soybean, and to a lesser extent other vegetable seeds, represent the principal source of phosphatides, and such are available under the trade designation of "crude lecithin." "Crude lecithin" from soybean sources is a product containing about 30% soybean oil and is a thick, viscous composition. In order to improve the ease of handling, and also to make it more readily acceptable for human consumption, the crude lecithin has in recent years been purified and rendered oil free, thereby providing a free flowing granular product having valuable qualities as a human food supplement. In this process of purification, the natural anti-oxidants, such as tocopherols, which confer upon the crude lecithin a limited stability, are substantially removed. In the granular form, and in the absence of the natural anti-oxidants, the exposure of more surfaces to the oxygen of the air accelerates its deterioration. The granular product after a relatively short exposure becomes viscous and rancid. This, of course, detracts from the usefulness of the granular product and from its acceptability as a food supplement.

It has been proposed to preserve the granular consistency of oil-free phosphatides by mixing them with salt and with certain sugars. Thus, in U.S. Patent 2,430,553, a stable free-flowing "lecithinated sugar" was prepared by admixing 42 parts of lecithin with 224 parts of sugar. Again in U.S. Patent 2,708,631, anhydrous dextrose was used as a carrier for lecithin, the latter being present in less than 20% by weight. In both of these patents, which may be taken as typical of the progress in the art of preparing granular phosphatide-sugar compositions, the lecithin is present in minor proportions, a factor which limits the field of application of the resulting compositions.

Also, it has been proposed to provide dry powders containing vegetable phosphatides by virtue of combining them with various inert carriers. This is exemplified by the compositions provided in U.S. Patent No. 2,057,695, wherein inert carriers including various sugars were admixed with vegetable phosphatides, the latter constituting less than about 60% of the desired granular mixture.

Accordingly, it is the object of this invention to provide stable lecithin compositions and preparation procedures therefor in which the lecithin is the major component and amounts to 95%–99% of the total weight. It is another object of the present invention to provide improved means of fortifying granular phosphatides against flavor deterioration for extended periods. These and other objects will be apparent from the following description of the invention.

It has now been found that granular phosphatides can be preserved in a free-flowing condition and protected against flavor deterioration and rancidity by the incorporation therewith of at least 1% and not more than 5% by weight of the phosphatides of a reducing monosaccharide; that is to say, a saccharide which will reduce Fehling's Solution.

The stabilizer phosphatide compositions of our invention are, surprisingly, substantially completely soluble in hexane and petroleum ether fractions of aliphatic hydrocarbons in the hexane boiling range. This fact is surprising since saccharides, per se, are not soluble in such solvents. Apparently, in the stabilization process the reducing saccharide is bound to the phosphatide forming a more stable composition or complex, which composition is soluble in hexane. Inasmuch as for some industrial applications phosphatide compositions are sold with specifications including "PEI" (petroleum ether insolubles), the discovery of a stabilized petroleum ether-soluble form of granular phosphatides has obvious commercial implications and value.

In practicing the method of this invention, we have found it practical to add a predetermined amount of reducing monosaccharide as a 40% aqueous solution to crude lecithin and agitate the mixture at 60° to 70° C. until a fairly homogeneous mass results. Thereafter, the mixture is dried in vacuo, e.g., 8 to 10 mm. of mercury, at 60° to 70° C. for about ½ hour. The dried mass is washed with acetone to remove the oil. After removing the residual solvent in vacuo, the dry stabilized product can be granulated, ground or processed further, as desired. In this form, the stabilized oil-free phosphatides remain free flowing and free from rancidity for extended periods, compared with an unstabilized oil-free control. For example, a mixture of 95% oil-free phosphatides and 5% fructose prepared as described above, is stable when stored at 25° C. and in the absence of direct sunlight for periods in excess of 12 months. Under similar conditions oil-free phosphatides containing no sugar of the character described, or other stabilizing material, will lose their free-flowing character and become rancid to taste in three months or less. The following examples will illustrate the present invention. Quantities are in parts by weight and temperatures are given in degrees centigrade unless otherwise specified.

EXAMPLE 1

To 100 parts of single-bleached crude lecithin, 3.35 parts of glucose in the form of a 40% aqueous solution was added. The mixture was agitated until homogeneous and then heated in vacuo at 70° C. for 1 hour to dry. The dried mass was washed four times with about 250 parts of acetone each time. The washed mass was granulated and the residual solvent removed in vacuo. The dried, granular product contained about 5% glucose, which was not detectable to the taste. In an analogous fashion, a control granular phosphatide mass was prepared, but omitting the addition of the 40% aqueous glucose solution.

These products were tested by an accelerated stability test in which the granular phosphatides were placed in a 150 cc. beaker and stored in a constant temperature room at 120° F. The products were also subjected to radiation from a 150-watt light bulb.

The stability of the samples was determined by their peroxide value (P.V.), a P.V. of 100 being taken as the limit of acceptability. The following table lists the results of the stability tests with the products prepared as described hereinabove:

*Table I*

GRANULAR PHOSPHATIDES

| Days | Control | +5% Glucose |
|---|---|---|
| 0 | P.V.=10 | P.V.=10. |
| 4 | 68 | 23. |
| 15 | 49 | 20. |
| 21 | 55 | 20. |
| 28 | 70 | 25. |
| 36 | 110 | 35. |
| 70 | rubbery polymerized mass | "skinning." |

It will be seen from the results of this accelerated aging test, that the presence of 5% glucose preserved the granular phosphatides for a period almost twice that of the control.

Replacement of the glucose with an equal weight of fructose gave a granular phosphatide product of like stability.

EXAMPLE 2

Granular phosphatides were prepared as described in Example 1 above containing sucrose (a non-reducing saccharide), glucose and fructose (reducing saccharides) in varying percentages. These preparations were submitted to the accelerated stability test and compared with a similar prepared saccharide-free control.

The results were as follows:

Control _____P.V. of 110 after 36 days
5% glucose (reducing)_____P.V. of 35 after 36 days
5% fructose (reducing)_____P.V. of 40 after 26 days
5% sucrose (non-reducing)___P.V. of 110 after 15 days These data indicate the value of small quantities of a reducing saccharide in preserving granular phosphatides. Such stability was not obtained when a non-reducing saccharide was used.

EXAMPLE 3

A variety of carbohydrate agents were tested at the 5% level for their ability to preserve granular phosphatides. The test samples were prepared as described in Example 1 and the accelerated stability tests were carried out at 120° F. and in the presence of radiation from a 189-watt bulb source. These results were reported as the time required for the P.V. of the test sample to reach 100 at least, and this period is called the "keeping time."

The results follow:

*Table II*

| Saccharide | Type | Keeping Time (in days) |
|---|---|---|
| None (control) | | 18. |
| Sorbitol | Sugar-derived polyhydric alcohol. | 25. |
| Raffinose | Non-reducing trisaccharide. | 24. |
| α-Methyl d-glucoside | Non-reducing glucoside | 24. |
| Arabinose | Reducing pentose | P.V. of 25 after 50. |
| Rhamnose | Reducing methyl-pentose | P.V. of 35 after 50. |

These data indicate the surprising increase in "shelf stability" (i.e., keeping qualities), resistance to oxidative and flavor deterioration of granular phosphatides in intimate admixture with a reducing saccharide. It will be readily seen from the above illustrative examples that a new and improved means has been devised for preserving granular phosphatides in a free-flowing and pleasant tasting condition.

It has been found that at least 1% by weight of the reducing monosaccharide, such as fructose or glucose, is required to render the granular phosphatides stable for extended periods. On a practical consideration of availability and cost, fructose and glucose are the reducing saccharides which are preferred. However, about 5% is preferred.

The effectiveness of the monosaccharides in preserving phosphatides can be appreciated from a consideration of Example 4, in which a reducing disaccharide, i.e., lactose, was employed in the procedure set forth in Example 1.

EXAMPLE 4

A granular phosphatide product was prepared as described in Example 1 containing about 5% lactose (a reducing disaccharide), as was a lactose-free control phosphatide. These preparations were submitted to the accelerated stability test under conditions afforded by irradiation by a light source of 100-watts and in which the test samples were exposed to room atmosphere. The following table lists the results:

*Table III*

| Days | Control | +5% Lactose |
|---|---|---|
| 0 | 5 | 5 |
| 2 | 6 | 5 |
| 7 | 10 | 10 |
| 14 | 18 | 22 |
| 24 | 44 | 54 |
| 28 | 42 | 34 |
| 32 | 56 | 64 |
| 63 | 110 | 144 |

The manner in which the stabilizing agent is blended with the granular phosphatides is also subject to wide variation. As indicated in the examples, which are representative of the preferred manner, the saccharide is added as an aqueous solution to the crude lecithin. The agent can also be blended with the oil-free phosphatides in any other convenient manner. For example, an aqueous solution of the reducing saccharide can be added to the oil-free phosphatides and after mixing to thoroughly wet the phosphatides, the mass can be dried to remove moisture. The advantageous features of the invention insofar as hexane solubility are concerned are best achieved through the employment of aqueous solutions of the reducing monosaccharide. This results in the previously referred to complex. Illustrative of the complex formation achieved in the practice of the invention is the following:

EXAMPLE 5

Twenty grams of crude commercial soybean lecithin (containing about 67% phosphatides and remainder soybean oil) was freed of soybean oil by extracting it with three successive 100-ml. portions of acetone. After the final extract, the solvent-wet product was filtered, granulated and dried for thirty minutes at 70° C. This material served as a control in the solubility experiments described below.

One hundred grams of crude commercial soybean lecithin (containing about 67% phosphatides and remainder soybean oil) was heated to 75° C. in a 500 ml. three-necked flask equipped with a motor-driven agitator, thermometer and a down-coming condenser connected to a vacuum source (water aspirator). To the heated mixture, a solution of 3.53 g. of anhydrous glucose dissolved in 10 ml. of water was added. After agitating for ten minutes at 75–80° C., vacuum was gradually applied to the emulsion until a maximum of 10 mm. Hg pressure achieved. The drying operation was continued for thirty minutes.

Twenty grams of this sugar complex was freed of soybean oil by extracting it with three successive 100-ml. portions of acetone. After the final extraction, the solvent-wet product was filtered, granulated and dried for thirty minutes at 70° C. This product is referred to below as the oil-free phosphatide-5% glucose complex.

The mixture was prepared in exactly the same manner as the reducing sugar complex as described above, with one exception; the glucose was added dry. This product is referred to below as oil-free phosphatide-5% glucose dry-mix.

To determine the hexane-solubility of the three products described above, a 0.5-g. sample was mixed with 20 ml. of hexane. After about five to ten minutes of stirring, the extent of solubility was noted visually. The results are summarized as follows:

*Table IV*

| Product | Solubility in Hexane |
| --- | --- |
| Control Oil-Free Phosphatides | Soluble. |
| Oil-Free Phosphatides—5% Glucose Complex. | Soluble (slight haze). |
| Oil-Free Phosphatides—5% Glucose Dry-Mix. | White crystalline residue of glucose. |

This evidence, together with the knowledge that glucose is not soluble in hexane, demonstrates that the phosphatide-reducing sugar complex and the dry-mix are not equivalent. A new moiety has been formed by the sugar and phosphatide which is characterized by hexane solubility as described.

Granular phosphatides are becoming of increasing importance as a dietary supplement. In this use it has been advocated, especially in geriatrics, as a means of preventing or ameliorating the adverse effects of cholesterol in the circulatory system. For such purpose, granular phosphatides have been made available to the ultimate consumer in packages wherein a reasonable shelf life is an essential factor in obtaining consumer acceptance. The commercial distribution practices conventional to perishable products of this nature require a shelf life of the order of 12 months to insure that the ultimate consumer receives the phosphatides in a free-flowing, palatable condition.

The present invention provides an efficient and practical means for stabilizing granular phosphatides against the deterioration in taste and odor due to oxidation and for maintaining the stabilized product in a free-flowing condition. It thus permits the distribution of such a product to the consumer through the ordinary merchandising channels presently employed in connection with edible goods.

We claim:

1. In a method of maintaining a granular oil-free phosphatide product containing at least about 95% phosphatide free-flowing and free of deterioration, the steps of treating a phosphatide with an aqueous solution of a reducing saccharide to form a hexane-soluble product, the saccharide being present in said solution in a quantity sufficient to provide from 1% to 5% by weight of the granular, oil-free phosphatide, mixing the solution and phosphatide, drying the resulting mixture, and granulating the dried product.

2. The method of claim 1 in which the reducing saccharide is a member selected from the class consisting of fructose and glucose.

3. In a method for preparing free-flowing, granular oil-free phosphatides wherein crude phosphatide is extracted with organic solvent to remove the glyceride oil portion thereof, and is subsequently treated to remove the residual organic solvent, the improvement which comprises the steps of adding to said phosphatide, at any stage in advance of its recovery in a granular oil-free condition, an aqueous solution of a monosaccharide containing enough of the latter to provide between 1% and 5% thereof by weight on the granular oil-free phosphatide, mixing said added solution with the phosphatide, drying the resulting mixture, and finally granulating the phosphatide-saccharide product.

4. In a method of preserving the free-flowing character, odor and taste of a granular, oil-free phosphatide product containing at least about 95% phosphatide, the steps of mixing a phosphatide with an aqueous solution of glucose to provide a hexane-soluble product, said solution containing enough glucose to provide between 1% and 5% thereof by weight on the granular, oil-free phosphatide, and thereafter drying and granulating the mixture.

5. In a method of maintaining a granular oil-free phosphatide product containing at least about 95% phosphatide free-flowing and free of deterioration, the steps of treating a phosphatide with an aqueous solution of fructose to form a hexane-soluble product, the fructose being present in said solution in a quantity sufficient to provide from 1% to 5% by weight of the granular, oil-free phosphatide, mixing the solution and phosphatide, drying the resulting mixture, and granulating the dried product.

References Cited in the file of this patent

UNITED STATES PATENTS

| | | |
| --- | --- | --- |
| 2,057,695 | Schwieger | Oct. 20, 1936 |
| 2,334,401 | Fitzpatrick et al. | Nov. 16, 1943 |
| 2,632,705 | Scharf | Mar. 24, 1953 |
| 2,708,631 | Neiman | May 17, 1955 |